United States Patent
Bonnstetter et al.

(10) Patent No.: US 10,634,472 B1
(45) Date of Patent: Apr. 28, 2020

(54) PREFRAGMENTED WARHEADS WITH ENHANCED PERFORMANCE

(71) Applicant: Northrop Grumman Innovation Systems, Inc., Plymouth, MN (US)

(72) Inventors: Gabriel J. Bonnstetter, Maple Grove, MN (US); Richard M. Truitt, Champlin, MN (US); Reid W. Wagnild, Plymouth, MN (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 0 days.

(21) Appl. No.: 15/466,476

(22) Filed: Mar. 22, 2017

Related U.S. Application Data

(60) Provisional application No. 62/311,737, filed on Mar. 22, 2016.

(51) Int. Cl.
| | |
|---|---|
| F42B 10/00 | (2006.01) |
| F42B 12/32 | (2006.01) |
| F42B 33/02 | (2006.01) |
| B29C 39/10 | (2006.01) |
| B29K 705/00 | (2006.01) |
| B29L 31/00 | (2006.01) |
| B29K 101/12 | (2006.01) |
| B29C 39/02 | (2006.01) |

(52) U.S. Cl.
CPC .......... F42B 12/32 (2013.01); F42B 33/0214 (2013.01); *B29C 39/021* (2013.01); *B29C 39/10* (2013.01); *B29K 2101/12* (2013.01); *B29K 2705/00* (2013.01); *B29L 2031/7772* (2013.01)

(58) Field of Classification Search
CPC ................................ F42B 12/32; F42B 12/56
See application file for complete search history.

(56) References Cited

U.S. PATENT DOCUMENTS

| | | | |
|---|---|---|---|
| 2,413,008 A | | 12/1946 | Taglialatela |
| 3,263,612 A | | 8/1966 | Throner, Jr. |
| 3,474,731 A | | 10/1969 | Thomanek |
| 3,498,224 A | | 3/1970 | Cordle et al. |
| 3,667,390 A | | 6/1972 | Medin et al. |
| 3,675,577 A | | 7/1972 | Sternberg et al. |
| 3,741,123 A | | 6/1973 | Dittrich |
| 3,815,504 A | * | 6/1974 | Tieben .................... F42B 12/32 102/496 |
| 3,820,464 A | | 6/1974 | Dixon |
| 3,974,771 A | | 8/1976 | Thomanek |
| 3,977,327 A | | 8/1976 | Brumfield et al. |
| 3,978,796 A | | 9/1976 | Hackman |
| 4,089,267 A | | 5/1978 | Mescall et al. |

(Continued)

*Primary Examiner* — J. Woodrow Eldred
(74) *Attorney, Agent, or Firm* — Christensen, Fonder, Dardi and Herbert PLLC

(57) ABSTRACT

A deliverable weapon, such as a missile, an artillery round, an aerial bomb, or a mortar round, having an explosive warhead, utilizes concentric annular sleeves that upon detonation provide placement of smaller fragments of an inner annular sleeve interstitially with respect to larger fragments of an outer annular sleeve in an expanding fragmentation curtain that contains expanding gases to increase the pressure of the explosion and the kinetic energy transferred to the fragments. In embodiments, the sleeves are comprised of ordered layers of spherical metal fragments encased in binder material and an outer casing.

21 Claims, 12 Drawing Sheets

(56) References Cited

U.S. PATENT DOCUMENTS

| | | | |
|---|---|---|---|
| 4,106,410 A | 8/1978 | Borcher et al. | |
| 4,303,015 A | 12/1981 | Bourlet | |
| 4,524,696 A | 6/1985 | Altenau et al. | |
| 4,644,867 A | 2/1987 | Hellner et al. | |
| 4,648,323 A | 3/1987 | Lawther | |
| 4,760,793 A | 8/1988 | Herring, III | |
| 4,781,118 A | 11/1988 | Assmann | |
| 4,882,996 A | 11/1989 | Bock et al. | |
| 4,936,217 A | 6/1990 | Hofmann et al. | |
| 4,982,668 A | 1/1991 | Bender et al. | |
| 5,313,890 A | 5/1994 | Cuadros | |
| 6,202,561 B1 | 3/2001 | Head et al. | |
| 6,276,278 B1 | 8/2001 | Korpe | |
| 7,156,024 B2 | 1/2007 | Ronn et al. | |
| 7,614,348 B2 | 11/2009 | Truitt et al. | |
| 7,765,933 B2 | 8/2010 | Poore et al. | |
| 8,061,275 B1 | 11/2011 | Gold | |
| 8,171,849 B2 | 5/2012 | Amick | |
| 8,176,849 B1 | 5/2012 | Gold et al. | |
| 8,973,503 B2 | 3/2015 | Dunaway et al. | |
| 2004/0074413 A1* | 4/2004 | Ronn | F42B 12/32 102/514 |
| 2004/0089185 A1* | 5/2004 | Ronn | F42B 12/32 102/494 |
| 2009/0211484 A1* | 8/2009 | Truitt | F42B 12/32 102/497 |
| 2014/0020590 A1* | 1/2014 | Torsten | F42B 33/00 102/495 |
| 2014/0230682 A1 | 8/2014 | Bonnstetter et al. | |
| 2016/0349027 A1* | 12/2016 | Kerns | F42B 12/34 |

* cited by examiner

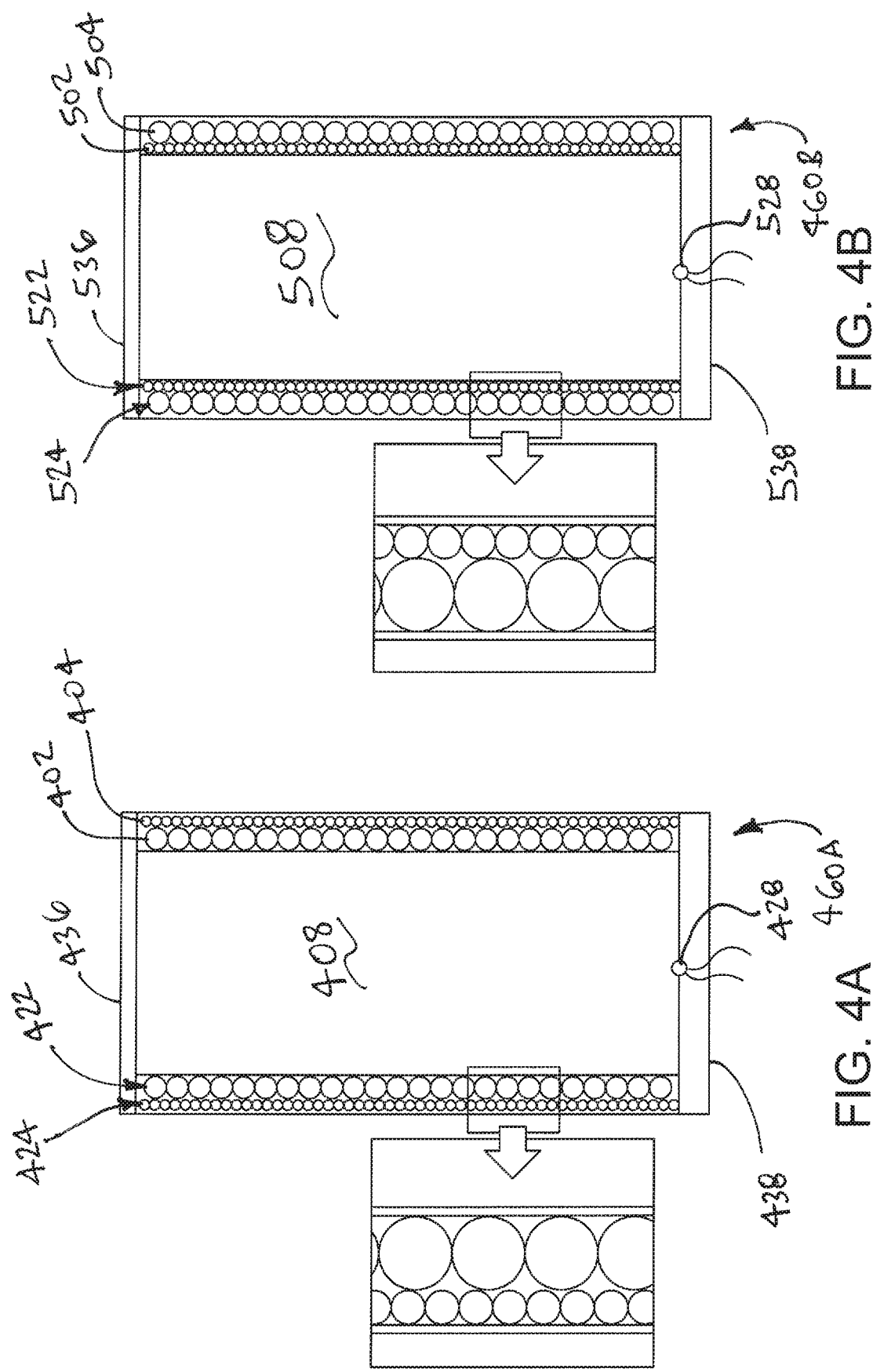

FIG. 5C - LEGEND

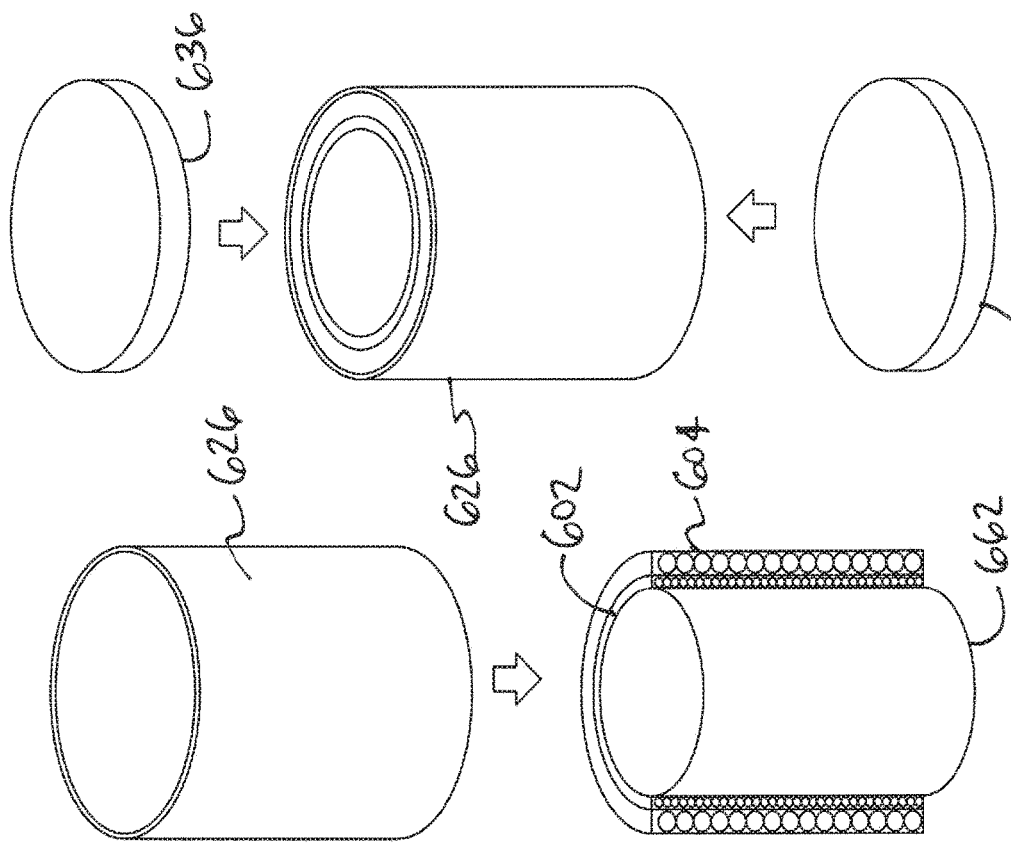
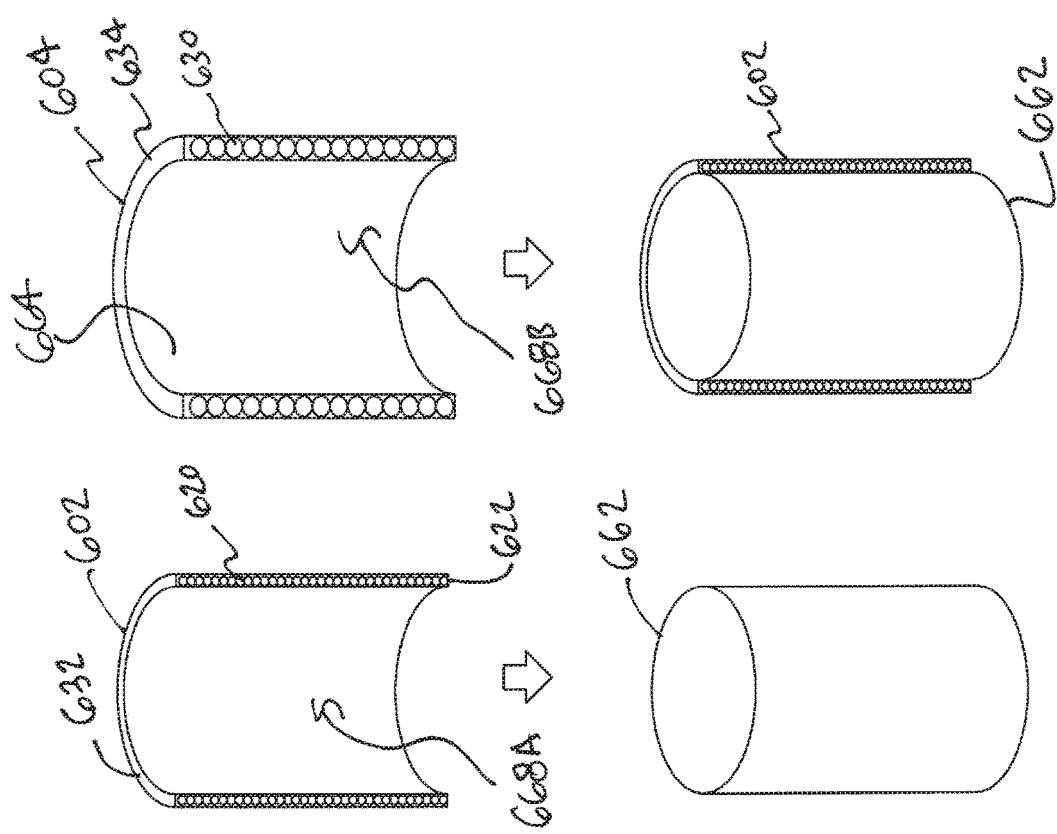
FIG. 6A   FIG. 6B   FIG. 6C   FIG. 6D

PREFRAGMENTED WARHEADS WITH ENHANCED PERFORMANCE

CROSS-REFERENCE TO RELATED APPLICATIONS

This application claims the benefit of U.S. Provisional Patent Application No. 62/311,737, filed Mar. 22, 2016, which is hereby fully incorporated herein by reference.

FIELD OF THE TECHNOLOGY

The present disclosure relates generally to weapons and, more particularly, to warheads including preformed fragments.

BACKGROUND

When U.S. military personnel go into battle, they rely on sophisticated and efficient weaponry to defeat enemy forces. In an effort to reduce the number of causalities suffered by U.S. forces, modern weapons are designed to deliver payloads from great distances with uncanny accuracy. Examples of these modern weapons include guided missiles, guided bombs dropped from aircraft including unmanned aerial vehicles (UAVs), and guided artillery shells. The primary destructive power of these weapons is provided by the warheads they carry.

Warheads are used in a variety of military applications to deliver a distribution of high-velocity fragments across a target area. The penetration effectiveness of a fragment when it strikes a target is directly proportional to the fragment's kinetic energy. The fragments kinetic energy is derived from an explosion. An explosion is a rapid increase in volume and release of energy accompanied by the generation of high temperatures and the release expanding gases. Supersonic explosions created by high explosives are known as detonations and travel via supersonic shock waves.

SUMMARY OF THE INVENTION

A deliverable weapon, such as a missile, an artillery round, an aerial bomb, a mortar round, or a grenade, having an explosive warhead, utilizes concentric annular sleeves that upon detonation provide placement of smaller fragments of an inner annular sleeve interstitially with respect to larger fragments of an outer annular sleeve in an expanding fragmentation curtain that contains expanding gases to increase the pressure of the explosion and the kinetic energy transferred to the fragments. In embodiments, the sleeves are comprised of ordered layers of spherical metal fragments encased in binder material and an outer casing.

According to an example embodiment, a warhead for a deliverable or non-deliverable weapon comprises an explosive charge and a first sleeve comprising a first set of uniform sized spherical fragments embedded in a binder disposed about the explosive charge. The warhead also includes a second sleeve comprising a second set of uniform sized spherical fragments embedded in a binder and disposed about the first sleeve. In this example embodiment, the first set of fragments comprise small fragments and the second set of fragments comprise large fragments. The warhead may also include a housing containing the first sleeve, the second sleeve, and the explosive charge.

In some example embodiment, the second sleeve has a single row of spherical fragments in an ordered arrangement. In some example embodiments, the arrangement of the spherical fragments may be somewhat chaotic generally due to the fragment sleeve thickness being greater than the fragment diameter. In some example embodiments, the large fragments in the second set of fragments are arranged in a plurality of axial columns and circumferential rows with adjacent circumferential rows being offset from one another in an axial direction and adjacent axial columns being offset from one another in a circumferential direction. It is contemplated that the fragments may have various non-spherical shapes in some embodiments.

In some cases, the large fragments are larger than the small fragments diametrically by at least 50%. In other embodiments, the large fragments are larger than the small fragments diametrically by at least 100%. In embodiments, volumetrically, the large fragments are at least 300% larger than the small fragments. In embodiments, volumetrically, the large fragments are at least 600% larger than the small fragments.

In some cases, the mean sizes of the large fragments are larger than the mean size of the small fragments diametrically by at least 50%. In other embodiments, the means size of the large fragments are larger than the mean size of the small fragments diametrically by at least 100%. In embodiments, volumetrically, the mean sizes of the large fragments are at least 300% larger than the mean size of the small fragments. In embodiments, volumetrically, the mean sizes of the large fragments are at least 600% larger than the mean size of the small fragments. In embodiments, substantially all of the large fragments are larger than substantially all of the small fragments. In some cases, the mean sizes of the greatest linear dimension of the large fragments are larger than the mean size of the greatest linear dimension of the small fragments by at least 50%. In other embodiments, the means size of the greatest linear dimension of the large fragments are larger than the greatest linear dimension of the mean size of the small fragments by at least 100%. In other embodiments, the means size of the greatest linear dimension of the large fragments are larger than the greatest linear dimension of the mean size of the small fragments by at least 300%.

In some example embodiments, the first sleeve is disposed between the explosive charge and the second sleeve so that expanding gases produced by the explosive charge upon detonation push the small fragments into contact with the large fragments. Also in some example embodiments, the small and large fragments have curved outer surfaces that facilitate migration of the small fragments into interstitial spaces between the large fragments when small fragments are forced into contact with large fragments upon detonation of the explosive charge so that the flow of the expanding gases through the interstitial spaces is restricted by the small fragments. The small fragments and the large fragments may form an expanding fragmentation curtain that provides improved containment of expanding gases compared to other fragmentation arrangements, and increases the total kinetic energy of the fragments.

The acceleration of the smaller fragments compared to the larger fragments, presuming common densities, varies with the inverse of the radii of the fragments. Thus, under the same explosive pressure, the larger fragments will not accelerate as fast as the smaller fragments, and immediately post detonation, will have less velocity and less kinetic energy. Placing small fragments interior to the large fragments such that the small fragments acceleration is impeded by larger fragments, the small and large fragments coalesce into a curtain immediately after the explosion providing an enhanced dynamic containment of the expanding gases increasing the pressure of the explosion and ultimately the kinetic energy of the fragments. Thus, a feature and advantage of embodiments of the invention is that with the bound uniform small fragments interior to the bound large fragments in an explosive condition, after the small and large fragments are unbound as the binder disintegrates, the small and large fragments provide an improved coalescence, that is, a generally greater density of fragments large and small, providing improved containment of the expanding explosive gases, increasing the explosive pressure providing enhanced acceleration and velocity to the fragments, large and small, and providing a net increase in kinetic energy of the totality of the fragments.

In some example embodiments, the first wall of the first sleeve comprises a first binding material, the second wall of the second sleeve comprises a second binding material, and the first binding material is substantially the same as the second binding material. In some example embodiments, the first binding material and/or the second binding material may comprise a thermoplastic resin. In some example embodiments, the first binding material and/or the second binding material may comprise a thermosetting polymer. In some example embodiments, the first binding material and/or the second binding material may comprise an epoxy.

In some example embodiments, the first binding material and the second binding material hold the small fragments separate from the large fragments prior to detonation of the explosive charge and the first binding material and the second binding material break into pieces and/or disintegrate upon detonation of the explosive charge so that the small fragments and the large fragments are free to contact each other.

In some example embodiments, the small fragments and the large fragments have a first infrangibility, the first binding material and the second binding material have a second infrangibility, and the first infrangibility is greater than the second infrangibility. It is contemplated that small fragments and/or large fragments may be deformed after detonation of explosive charge. Whether or not the fragments are deformed, the infrangibility of the fragments may be sufficient to prevent each fragment from breaking into a plurality of pieces.

In some example embodiments, the binding material is generally frangible and the fragments generally are not; stated differently, the first binding material is more frangible than the first fragments and the second binding material is more frangible than the second fragments. That is, for example, during the detonation of the explosive charge the first binding material disintegrates and the first fragments mostly remain intact; additionally the second binding material disintegrates and the second fragments mostly remain intact.

In embodiments, the binding material is generally frangible and the fragments are generally are not. The fragments are ductile and the binding material is not. In embodiments, upon detonation, the binding material is generally frangible and the fragments are generally are not, and the fragments are ductile and the binding material is not.

In some example embodiments, the small fragments and the large fragments comprise the same material. For example, the small fragments and the large fragments may both comprise a tungsten alloy or they may comprise steel.

In some example embodiments, the majority of the small fragments in the first set of fragments have a generally spherical outer surface. For example, substantially all of the small fragments in the first set of fragments have a generally spherical outer surface in some embodiments. In some example embodiments, the majority of the small fragments in the first set have substantially equal diameters. For example, substantially all of the small fragments in the first set of fragments may have substantially equal diameters in some embodiments.

In some example embodiments, the majority of the large fragments in the second set of fragments have a generally spherical outer surface. For example, substantially all of the large fragments in the second set of fragments have a generally spherical outer surface in some embodiments.

An illustrative method of manufacturing a warhead may include loading a first multiplicity of spherical fragments of a uniform first size within a first annular containment in an ordered arrangement and filling the first annular containment with a first annular containment binder for at least substantially covering the first multiplicity of spherical fragments. The first annular containment binder may have a flowable condition to facilitate filling of the first annular containment. The illustrative method may include allowing the binder to harden wherein the spherical fragments are embedded within the first annular containment binder in a first annular form having the shape of the first annular containment. This illustrative method may also include loading a second multiplicity of spherical fragments of a uniform second size within a second annular containment having a wall surface that corresponds to a wall surface of the first annular containment. This method may additionally include filling the second annular containment with a second annular containment binder for at least substantially covering the multiplicity of spherical fragments. The second annular containment binder may have a flowable condition to facilitate filling of the second annular containment. The method may include allowing the second annular containment binder to harden wherein the spherical fragments are embedded within the second annular containment binder in a second annular form with the shape of the second annular containment. An explosive material may be positioned within a cavity defined by the annular forms. The first annular form, the second annular form and the explosive material may be positioned within a housing with one annular form interior to the other annular form.

In embodiments, a method of manufacturing a warhead comprises, loading a first multiplicity of spherical fragments of a uniform first size within a first annular containment in an ordered arrangement; filling the first annular containment with a first annular containment binder for at least substantially covering the first multiplicity of spherical fragments, the first annular containment binder having a flowable condition; allowing the binder to harden wherein the spherical fragments are embedded within the first annular containment binder in a first annular form having the shape of the first annular containment; loading a second multiplicity of spherical fragments of a uniform second size within a second annular containment having an inner wall surface that dimensionally corresponds to an outer wall of the first annular containment, the uniform second size diametrically at least 50 percent larger than the uniform size of the first multiplicity of spherical fragments; filling second annular containment with a second annular containment binder for at least substantially covering the multiplicity of spherical fragments, the first annular containment binder having a flowable condition; allowing the second annular containment binder to harden wherein the spherical fragments are embedded within the second annular containment binder in a second annular form with the shape of the second annular containment; positioning explosive material within a cavity defined by the first annular form; and affixing the first annular form and the second annular form within a housing with the first annular form interior to the second annular form; whereby upon detonation, an enhanced coalescence of small and large fragments post detonation increases the post explosion pressurization providing a net increase in kinetic energy.

Some example methods may include utilizing the first annular form to define part of the second annular containment and/or utilizing the second annular form to define part of the first annular containment.

Some example methods may include loading the second multiplicity of fragments such that each fragment that is not at a periphery of the ordered arrangement is in contact with at least four other adjacent fragments of the same size.

In embodiments of the invention, a method of increasing the kinetic energy of a multiple layered fragmentation device includes providing a layer of smaller fragments each with a mass inside of a layer of larger fragments, the larger fragments having a greater mass than the smaller fragments, and placing explosive material inside the layer inside the layer of smaller fragments.

In embodiments of the invention, a method of increasing the kinetic energy of a multiple layered fragmentation device includes providing a layer of fragments, the fragments in the layer all having substantially the same size, providing fragments with substantially the same mass, the layer of fragments each with a mass inside of a layer of larger fragments, the larger fragments having a greater mass than the smaller fragments.

Some example methods may include overmolding one of the first annular form and the second annular form over the other of the first annular form and the second annular form.

Some example methods may include utilizing a thermoplastic resin as the first annular containment binder. A thermoplastic resin may also be utilized for the second annular containment binder in some example methods.

Some example methods may include installing the warhead in a deliverable weapon such as a missile, an artillery round, an aerial bomb, a mortar round, or other fired projectiles, or a grenade. The methods and apparatus herein may also be utilized in a fixed application, such as a land mine or other non-delivered applications.

Some example methods may include selecting a uniform size for the large fragments that is diametrically at least 100 percent larger than the uniform size of the small fragments.

Some example methods, may include selecting a uniform size for the greatest linear dimension of the large fragments that is at least 100 percent larger than the greatest linear dimension of the small fragments. Where there is some variability in the size of the large fragments and/or the small fragments, the greatest linear dimension is the mean greatest linear dimension of the large and/or small fragments.

Some example methods may include utilizing steel for the spherical fragments of the first multiplicity of spherical fragments and for the second multiplicity of spherical fragments.

Some example methods may include utilizing a tungsten alloy for the spherical fragments of the first multiplicity of spherical fragments and for the second multiplicity of spherical fragments.

In some example embodiments, the maximum diameter of the spherical fragments of the second multiplicity of spherical fragments is 0.300 inches or less.

In some example embodiments, the majority of the large fragments in the second set have substantially equal diameters. For example, substantially all of the large fragments in the second set of fragments may have substantially the equal diameters in some embodiments.

In some embodiments an inner layer is sandwiched between an explosive portion and an outer layer, with portions of the inner layer having smaller fragments than a coinciding portion of the outer layer. Other portions of the inner layer may not have smaller fragments than a respective coinciding portion of the outer layer, for example at corners or end portions of the inner layer. Thus, in embodiments, a particular pair of layers of fragments need not have uniformity of fragmentation sizes or uniformity of the differentiation between the sizes of the inner and outer layer throughout the respective layers. In embodiments, the inner layer may be comprised of spherical fragments and the outer layer non-spherical fragments.

Patents incorporated by reference herein for all purposes include: U.S. Pat. Nos. 8,931,415, 7,614,348, 6,981,672, 5,925,845, 5,404,813, 5,107,766, and 3,724,379.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 4A is a stylized cross-sectional view illustrating a first warhead configuration;

FIG. 4B is a stylized cross-sectional view illustrating a second warhead configuration;

FIG. 5C is a legend for the charts of FIGS. 5A and 5B.

FIG. 6A through 6D are a series of stylized perspective views illustrating example methods in accordance with the disclosure and apparatus associated with those methods;

Figure 1:
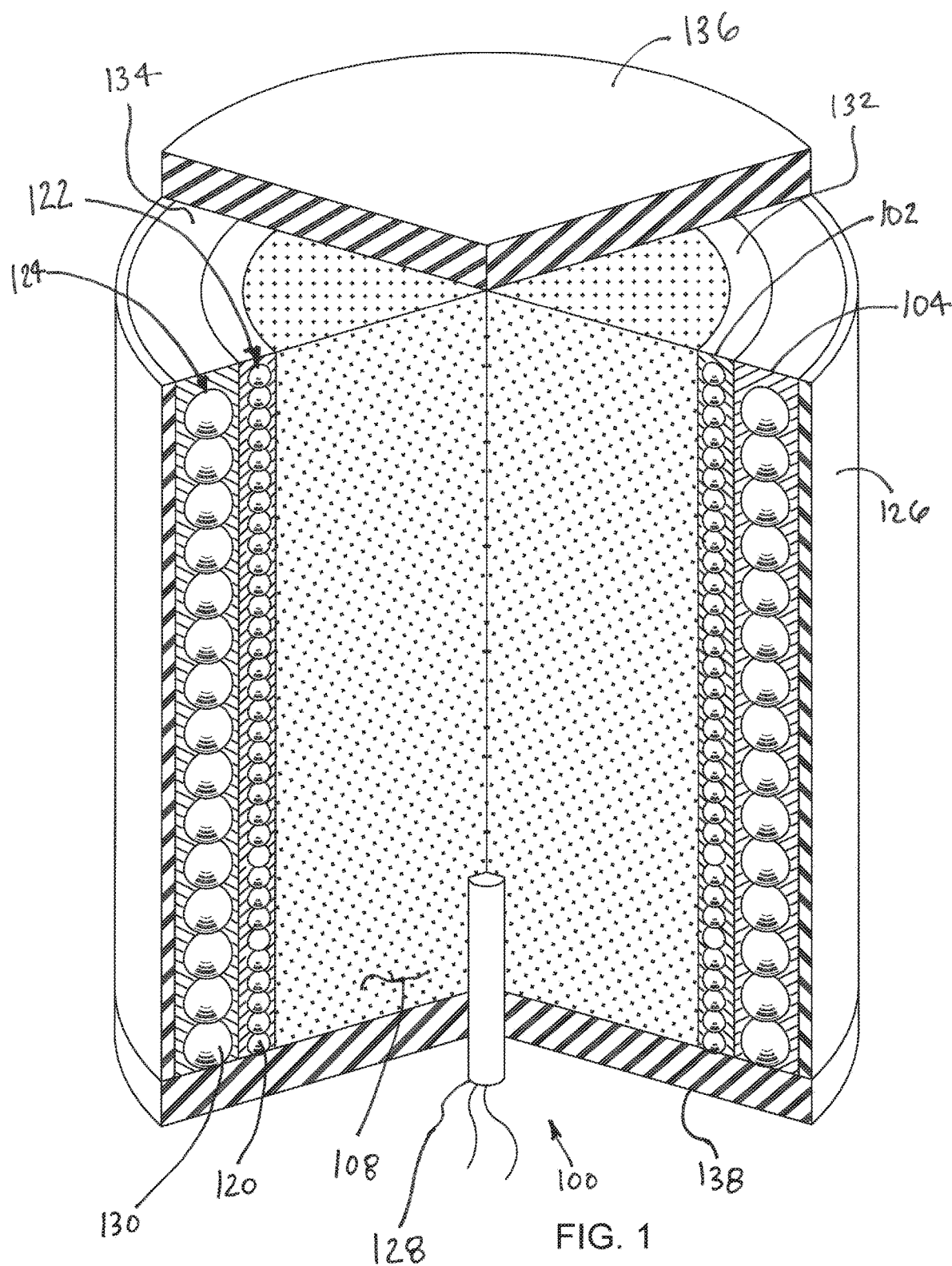
FIG. 1 is a perspective view showing a partially cross-sectioned warhead.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

FIG. 1 is a perspective view showing a partially cross-sectioned warhead 100 in accordance with the present detailed description. Warhead 100 of FIG. 1 comprises an explosive charge 108. Explosive charge 108 may comprise a cylindrical container filled with high explosives. A first sleeve 102 comprising a first set 122 of preformed fragments is disposed about explosive charge 108. A second sleeve 104 comprising a second set 124 of preformed fragments is disposed about both first sleeve 102 and explosive charge 108. With reference to FIG. 1, it will be appreciated that first sleeve 102 is sandwiched between explosive charge 108 and second sleeve 104 in the embodiment of FIG. 1. In embodiments, the fragments may be spherical as illustrated and are formed of metal, such as steel or tungsten.

In the embodiment of FIG. 1, the fragments of first sleeve 102 comprise relatively small fragments 120 and the fragments of second sleeve 104 comprise relatively large fragments 130 that are larger than small fragments 120. In the embodiment of FIG. 1, small fragments 120 are held in place by a first binding material 132 of first sleeve 102. Large fragments 130 are held in place by a second binding material 134 of second sleeve 104 in the embodiment of FIG. 1. In some embodiments, first binding material 132 and second binding material 134 may comprise the same material. Upon detonation of explosive charge 108, first binding material 132 and second binding material 134 may disintegrate so that small fragments 120 and large fragments 130 become unbound. When this is the case, small fragments 120 and large fragments 130 are free from the binding effect of first binding material 132 and second binding material 134 after detonation of explosive charge 108. In some example embodiments, the first binding material and/or the second binding material may comprise a thermoplastic resin. In some example embodiments, the first binding material and/or the second binding material may comprise a thermosetting polymer. In some example embodiments, the first binding material and/or the second binding material may comprise an epoxy.

It is contemplated that small fragments 120 and/or large fragments 130 may be deformed after detonation of explosive charge 108. In some useful embodiments, small fragments 120 and large fragments 130 are both preformed fragments having sufficient infrangibility and sufficient ductility to remain intact after detonation of explosive charge 108. First binding material 132 and second binding material 134 hold the fragments in place until detonation of explosive charge 108. However, first binding material 132 and second binding material 134 lack sufficient strength to remain intact after detonation of explosive charge 108. Said another way, the binding materials are more frangible and more brittle than the fragments. In particular, first binding material 132 is more frangible than small fragments 120 and second binding material 134 is more frangible than large fragments 130. In some embodiments, first binding material 132 and second binding material 134 obliterate upon detonation of explosive charge 108. Small fragments 120 and large fragments 130 are free to move relative to each other after first binding material 132 and second binding material 134 have broken into small pieces.

In the embodiment of FIG. 1, each small fragment 120 and each large fragment 130 has a generally spherical outer surface. With reference to FIG. 1, it will be appreciated that small fragments 120 of first sleeve 102 are sandwiched between explosive charge 108 and the large fragments 130 of second sleeve 104. With first sleeve 102 disposed between explosive charge 108 and second sleeve 104, expanding gases produced by explosive charge 108 upon detonation will push small fragments 120 into contact with large fragments 130. In some useful embodiments, small fragments 120 and large fragments 130 have curved outer surfaces that facilitate migration of small fragments 120 into interstitial spaces between large fragments 130 when small fragments 120 are forced into contact with large fragments 130 upon detonation of explosive charge 108. The presence of small fragments 120 in the interstitial spaces between large fragments 130 may restrict the flow of the expanding gases between large fragments 130. In this way, small fragments 120 and large fragments 130 may cooperate to contain the expanding gases for a longer time before venting of expanding gases has occurred. Increased containment of the expanding gases over a longer period of time may increase the kinetic energy transferred to the large fragments 130, while only minimally reducing the kinetic energy of the small fragments upon detonation of the explosive charge, thus increasing the total fragmentation kinetic energy significantly.

Warhead 100 of FIG. 1 includes a sheath 126 that is disposed about second sleeve 104, first sleeve 102 and explosive charge 108. A first cap 136 is fixed to a first end of sheath 126 and a second cap 138 is fixed to a second end of sheath 126. In FIG. 1, a detonator 128 of warhead 100 can be seen contacting explosive charge 108.

Figure 2:
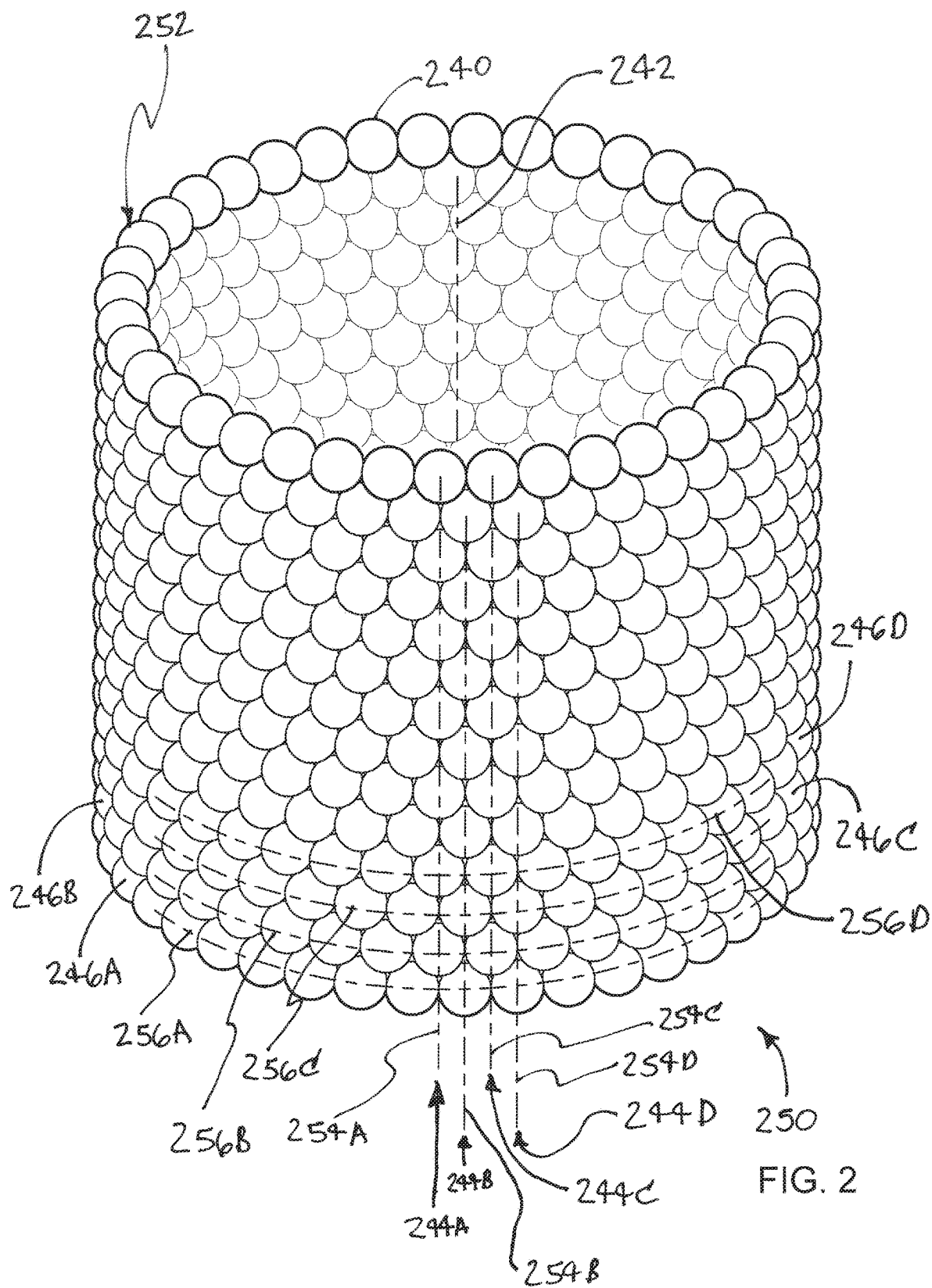
FIG. 2 is a perspective view showing a set of preformed fragments arranged to form a sleeve.

FIG. 2 is a perspective view showing a set of preformed fragments 240 arranged to form a sleeve 250. In the embodiment of FIG. 2, sleeve 250 includes a generally tubular wall 252 comprising a single layer of fragments 240 and each fragment 240 has a generally spherical outer surface. The fragments 240 are stacked so that adjacent pairs of fragments 240 are in tangential contact with one another in the embodiment of FIG. 2. The single layer of stacked spheres illustrated in FIG. 2 has a high compressive strength yet almost no shear strength. When sleeve 250 is incorporated into a warhead, a binding material may be used to hold fragments 240 in place prior to detonation of the warhead's explosive charge.

In the embodiment of FIG. 2, the fragments 240 of sleeve 250 are arranged in a plurality of axial columns 244 and circumferential rows 246. A first circumferential row 246A of sleeve 250 includes plurality of fragments 240 positioned along a first curved line 256A. Sleeve 250 also includes a second circumferential row 246B, a third circumferential row 246C, and a fourth circumferential row 246D. Second circumferential row 246B comprises a plurality of fragments 240 that are positioned along a second curved line 256B. Third circumferential row 246C comprises a plurality of fragments 240 that are positioned along a third curved line 256C. In the embodiment of FIG. 2, adjacent circumferential rows, such as second circumferential row 246B and third circumferential row 246C are offset from one another in an axial direction. Fourth circumferential row 246D comprises a plurality of fragments 240 that are positioned along a fourth curved line 256D.

In the embodiment of FIG. 2, sleeve 250 includes a plurality of fragments 240 positioned along a first line 254A to form a first axial column 244A. First line 254A is generally parallel to a central longitudinal axis 242 of sleeve 250 in the embodiment of FIG. 2. A plurality of fragments 240 are positioned along a second line 254B to form a second axial column 244B. In the embodiment of FIG. 2, adjacent axial columns, such as first axial column 244A and second axial column 244B, are offset from one another in a circumferential direction. A plurality of fragments 240 are positioned along a third line 254B to form a third axial column 244B. A plurality of fragments 240 are positioned along a fourth line 254B to form a fourth axial column 244B.

Figure 3B:
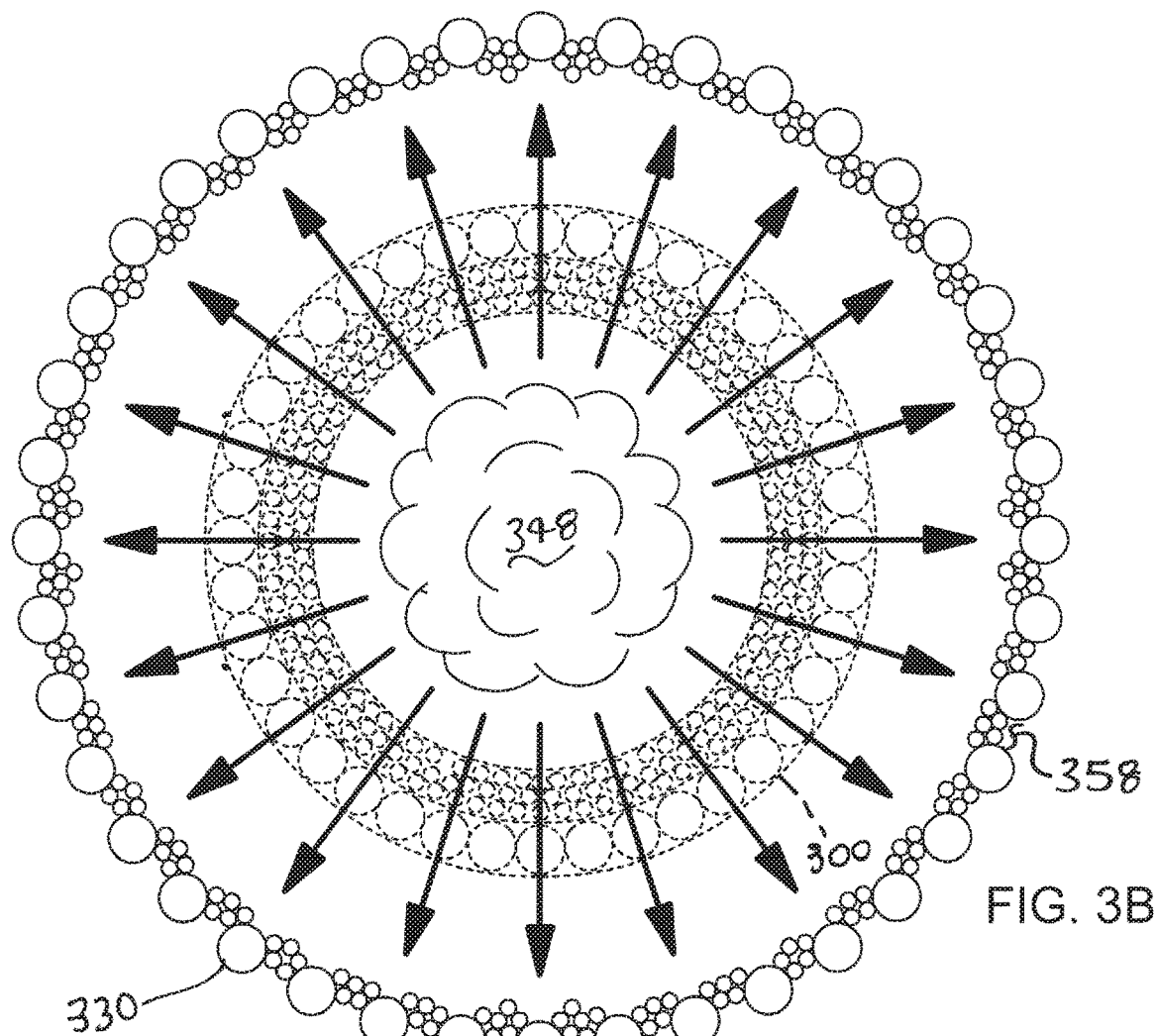
FIG. 3B is a stylized axial view illustrating the operating of the warhead shown in FIG. 3A.
Figure 3A:
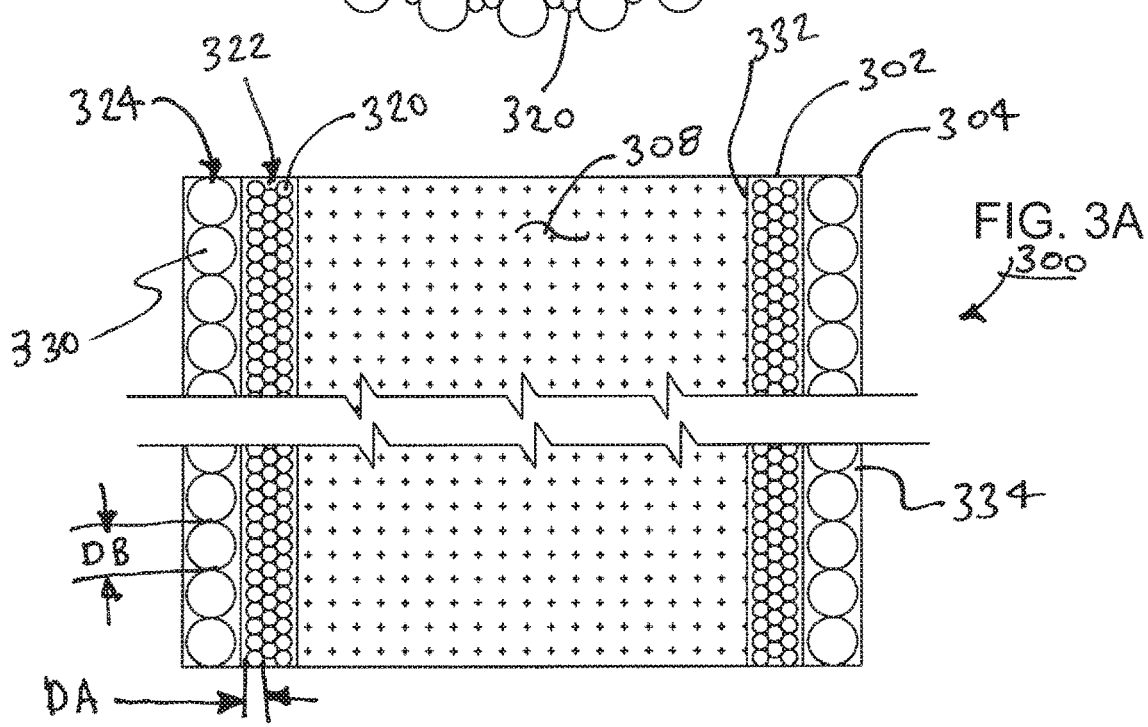
FIG. 3A is a stylized cross-sectional view illustrating a warhead including an explosive charge.

FIG. 3A is a stylized cross-sectional view illustrating a warhead 300 including an explosive charge 308. FIG. 3B is a stylized axial view illustrating the operating of the warhead shown in FIG. 3A. More particularly, FIG. 3B provides a stylized illustration showing elements of warhead 300 after detonation of the explosive charge using solid lines. Dashed lines are used to illustrate the elements of warhead 300 prior to detonation of the explosive charge.

With reference to FIG. 3A, it will be appreciated that warhead 300 comprises an explosive charge 308. A first sleeve 302 comprising a first set 322 of preformed fragments is disposed about explosive charge 308. A second sleeve 304 comprising a second set 324 of preformed fragments is disposed about both first sleeve 302 and explosive charge 308. With reference to FIG. 3A, it will be appreciated that first sleeve 302 is sandwiched between explosive charge 308 and second sleeve 304 in the embodiment of FIGS. 3A and 3B.

In the embodiment of FIGS. 3A and 3B, the fragments of first sleeve 302 comprise relatively small fragments 320 and the fragments of second sleeve 304 comprise relatively large fragments 330 that are larger than small fragments 320. In the embodiment of FIGS. 3A and 3B, small fragments 320 are held in place by a first binding material 332 of first sleeve 302. Large fragments 330 are held in place by a second binding material 334 of second sleeve 304 in the embodiment of FIGS. 3A and 3B. In some embodiments, first binding material 332 and second binding material 334 may comprise the same material.

In the embodiment of FIGS. 3A and 3B, small fragments 320 and large fragments 330 are both preformed fragments having sufficient strength to remain intact after detonation of explosive charge 308. For example, small fragments 320 and large fragments 330 may both comprise a tungsten alloy. First binding material 332 and second binding material 334 hold the fragments in place until detonation of explosive charge 308. However, first binding material 332 and second binding material 334 lack sufficient strength to remain intact after detonation of explosive charge 308. Said another way, the binding materials are sufficiently frangible to disintegrate upon detonation of explosive charge 308.

FIG. 3B is a stylized axial view showing elements of warhead 300 after detonation of the explosive charge using solid lines. Dashed lines are used to illustrate the elements of warhead 300 prior to detonation of the explosive charge.

With reference to FIG. 3B, it will be appreciated that expanding gases 348 produced by the explosive charge upon detonation have pushed small fragments 320 into contact with large fragments 330. The presence of small fragments 320 are disposed in interstitial spaces 358 between large fragments 330. The presence of small fragments 320 in interstitial spaces 358 between large fragments 330 may restrict the flow of the expanding gases 348 between large fragments 330. In this way, small fragments 320 and large fragments 330 may cooperate to contain expanding gases 348 for a longer time before venting of expanding gases 348 has occurred. Increased containment of expanding gases 348 over a longer period of time may increase the kinetic energy transferred to large fragments 330, while only reducing the energy of the small fragments slightly, upon detonation of explosive charge 308 thus significantly increasing the total kinetic energy of the fragmentation.

In some useful embodiments, small fragments 320 and large fragments 330 have curved outer surfaces that facilitate migration of small fragments 320 into interstitial spaces 358 between large fragments 330 when small fragments 320 are forced into contact with large fragments 330 upon detonation of explosive charge 308. In the embodiment of FIGS. 3A and 3B, each small fragment 320 and each large fragment 330 comprise a generally spherical outer surface. In the embodiment of FIGS. 3A and 3B, each small fragment 320 comprises a preformed sphere having a first diameter DA. Each large fragment 330 comprises a preformed sphere having a second diameter that is larger than the first diameter DB in the embodiment of FIGS. 3A and 3B.

FIG. 4A is a stylized cross-sectional view illustrating a first warhead configuration 460A. FIG. 4B is a stylized cross-sectional view illustrating a second warhead configuration 460B. Hydrocode analysis was performed on both first warhead configuration 460A and second warhead configuration 460B. The results of the hydrocode analysis are plotted in FIG. 5A and FIG. 5B.

The first warhead configuration 460A shown in FIG. 4A comprises a first sleeve 402 comprising a first set 422 of preformed fragments disposed about an explosive charge 408. A second sleeve 404 comprising a second set 424 of preformed fragments is disposed about both first sleeve 402 and explosive charge 408. In the embodiment of FIG. 4, the fragments of first sleeve 402 comprise relatively large fragments and the fragments of second sleeve 404 comprise relatively small fragments that are smaller than the fragments of first sleeve 402. First warhead configuration 460A includes a first cap 436 that is located at first end of the sleeves and a second cap 438 that is located at a second end of the sleeves. In FIG. 4A, a detonator 428 can be seen contacting explosive charge 408.

The second warhead configuration 460B shown in FIG. 4B comprises a first sleeve 502 comprising a first set 522 of preformed fragments disposed about an explosive charge 508. A second sleeve 504 comprising a second set 524 of preformed fragments is disposed about both first sleeve 502 and explosive charge 508. In the embodiment of FIG. 4B, the fragments of first sleeve 502 comprise relatively small fragments and the fragments of second sleeve 504 comprise relatively large fragments that are larger than the fragments of first sleeve 502. Second warhead configuration 460B includes a first cap 536 that is located at first end of the sleeves and a second cap 538 that is located at a second end of the sleeves. In FIG. 4B, a detonator 528 can be seen contacting explosive charge 508.

With reference to FIG. 4A and FIG. 4B, it will be appreciated that warhead configuration 460A and warhead configuration 460B both include an explosive charge. For purposes of the hydrocode analysis, warhead configuration 460A and warhead configuration 460B had identical explosive charges including the same mass of high explosives. Warhead configuration 460A and warhead configuration 460B both include a set of relatively small fragments and a set of relatively large fragments. For purposes of the hydrocode analysis, warhead configuration 460A and warhead configuration 460B had identical sets of small and large fragments having identical masses. The primary difference between the two configurations was the arrangement of the two sets of fragments. With reference to FIG. 4A and FIG. 4B, it will be appreciated that, in the first warhead configuration 460A shown in FIG. 4A the large fragments are located between the explosive charge and the small fragments. It will also be appreciated that, in the second warhead configuration 460B shown in FIG. 4B the small fragments are located between the explosive charge and of the large fragments.

Figures 5A, 5B:
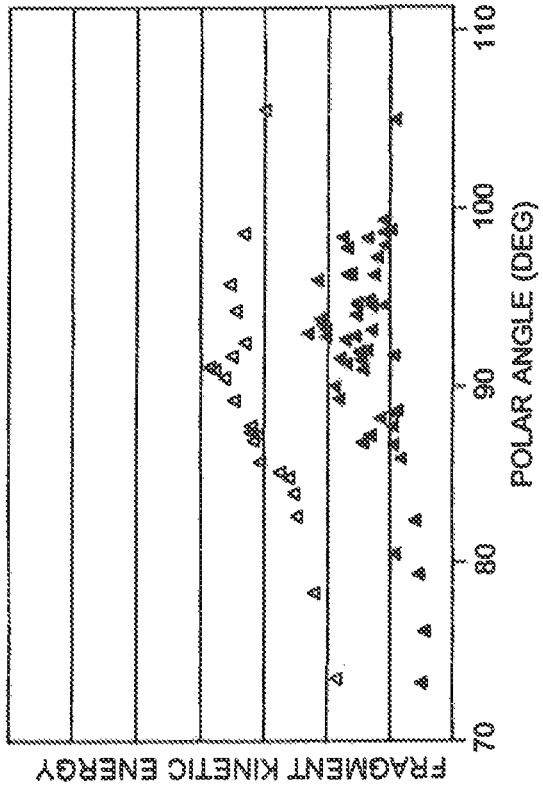
FIG. 5A is a graph showing the results of hydrocode analysis performed on the warhead configuration illustrated in FIG. 4A.
FIG. 5B is a graph showing the results of hydrocode analysis performed on the warhead configuration illustrated in FIG. 4B.

FIG. 5A and FIG. 5B are graphs illustrating the results of the hydrocode analysis performed on the two warhead configurations illustrated in FIG. 4A and FIG. 4B.

The graph shown in FIG. 5A illustrates the energy profile of the first warhead configuration 460A. Fragment kinetic energy vs. polar location is plotted on this graph. The data points representing the kinetic energy of the large fragments are shown as open triangles and the data points representing the kinetic energy of the small fragments are shown as closed triangles.

The graph shown in FIG. 5B illustrates the energy profile of a warhead with the second warhead configuration 460B. Fragment kinetic energy vs. polar location is plotted in this graph. The data points representing the kinetic energy of the large fragments are shown as open circles and the data points representing the kinetic energy of the small fragments are shown as closed circles.

The results of the hydrocode analysis showed a substantial increase in fragment kinetic energy of the second warhead configuration 460B as compared to the first warhead configuration 460A.

Figure 5D:
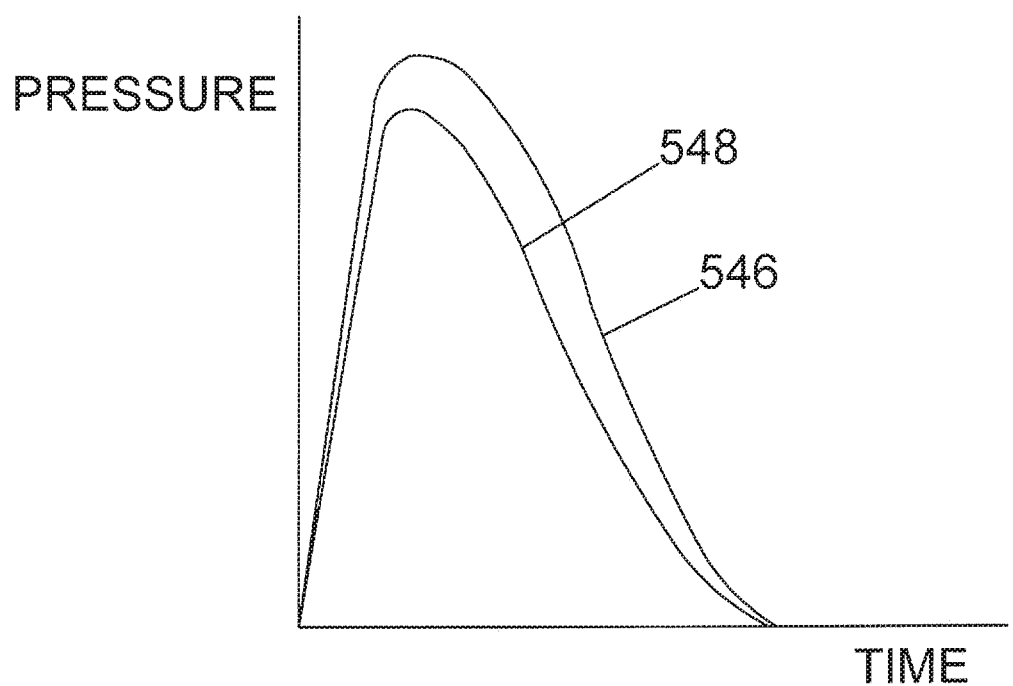
FIG. 5D is a theorized pressure curve chart illustrating gains associated with embodiments of the invention.

FIG. 5D is a theorized pressure curve chart illustrating gains associated with embodiments of the invention. FIG. 5D includes a first curve 546 and a second curve 548, with the second curve representing the theorized pressure gains associated with embodiments of the invention.

FIG. 6A through FIG. 6D are a series of stylized perspective views illustrating example methods in accordance with this detailed description and apparatus associated with those methods.

At FIG. 6A, a first sleeve 602 is assembled over an explosive fill container 662. High explosives may be placed in explosive fill container 662 at various times without deviating from the spirit and scope of this detailed description. In the embodiment of FIG. 6A, first sleeve 602 has a generally annular shape including an inner surface that defines a first cavity 668A. Although one half of an annular shape is shown, embodiments will include assembly of complete annular sleeves and partial annular sleeves. With reference to FIG. 6A, it will be appreciated that first cavity 668A is dimensioned to receive explosive fill container 662. First sleeve 602 comprises a first set 622 of preformed fragments. In the embodiment of FIG. 6A, first set 622 comprise small fragments 620.

At FIG. 6B, a second sleeve 604 is assembled over first sleeve 602 and explosive fill container 662. Second sleeve 604 has a generally annular shape including an inner surface 664 that defines a second cavity 668B. It will be appreciated that second cavity 668B is dimensioned to receive first sleeve 602 and explosive fill container 662. With reference to FIG. 6C, it will be appreciated that first sleeve 602 will be sandwiched between explosive charge 608 and second sleeve 604 after second sleeve 604 is assembled over first sleeve 602.

In the embodiment of FIG. 6B, the fragments of first sleeve 602 comprise relatively small fragments 620 and the fragments of second sleeve 604 comprise relatively large fragments 630 that are larger than small fragments 620. In the embodiment of FIG. 6B, small fragments 620 are held in place by a first binding material 632 of first sleeve 602. Large fragments 630 are held in place by a second binding material 634 of second sleeve 604 in the embodiment of FIG. 6B. In some embodiments, first binding material 632 and second binding material 634 may comprise the same material.

At FIG. 6C, a sheath 626 is installed over second sleeve 604, first sleeve 602 and explosive fill container 662. In the embodiment of FIG. 6C, sheath 626 has a generally annular or tube-like shape.

At FIG. 6D, a first cap 636 is fixed to a first end of sheath 626 and a second cap 638 is fixed to a second end of sheath 626. First cap 636, second cap 638 and sheath 626 may cooperate to contain, secure and protect all components located therein.

FIGS. 7A through 7G are a series of cross sectional views of a mold and steps of manufacturing in accord with embodiments of the invention.

Figures 7A, 7B:
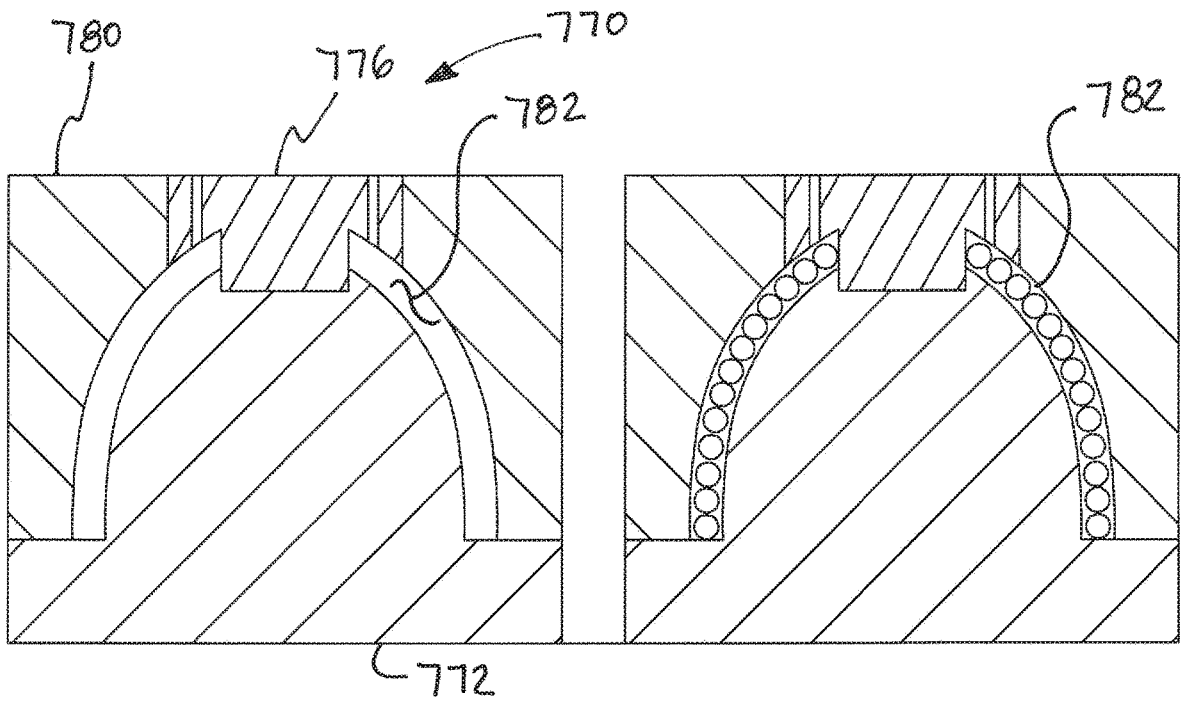
FIGS. 7A through 7G are a series of cross sectional views of a mold and steps of manufacturing in accord with embodiments of the invention.

At FIG. 7A, a mold 770 is provided. With reference to FIG. 7A, it will be appreciated that mold 770 defines a first annular containment 782. In the embodiment of FIG. 7A, mold 770 comprises a first core 772, a mold body 780, and a first plug 776. First core 772, mold body 780, and first plug 776 cooperate to define the first annular containment 782 in the embodiment of FIG. 7A. With reference to FIG. 7A, it will be appreciated that the first plug 776 defines passageways that fluidly communicate with the first annular containment 782.

At FIG. 7B, a first multiplicity of spherical fragments of a uniform first size are loaded within the first annular containment 782. In the exemplary embodiment of FIG. 7B, the first multiplicity of spherical fragments are arranged to form a wall comprising a single layer of fragments. The fragments are arranged so outer spherical surfaces of adjacent pairs of fragments are in tangential contact with one another in the embodiment of FIG. 7B.

Figures 7C, 7D:
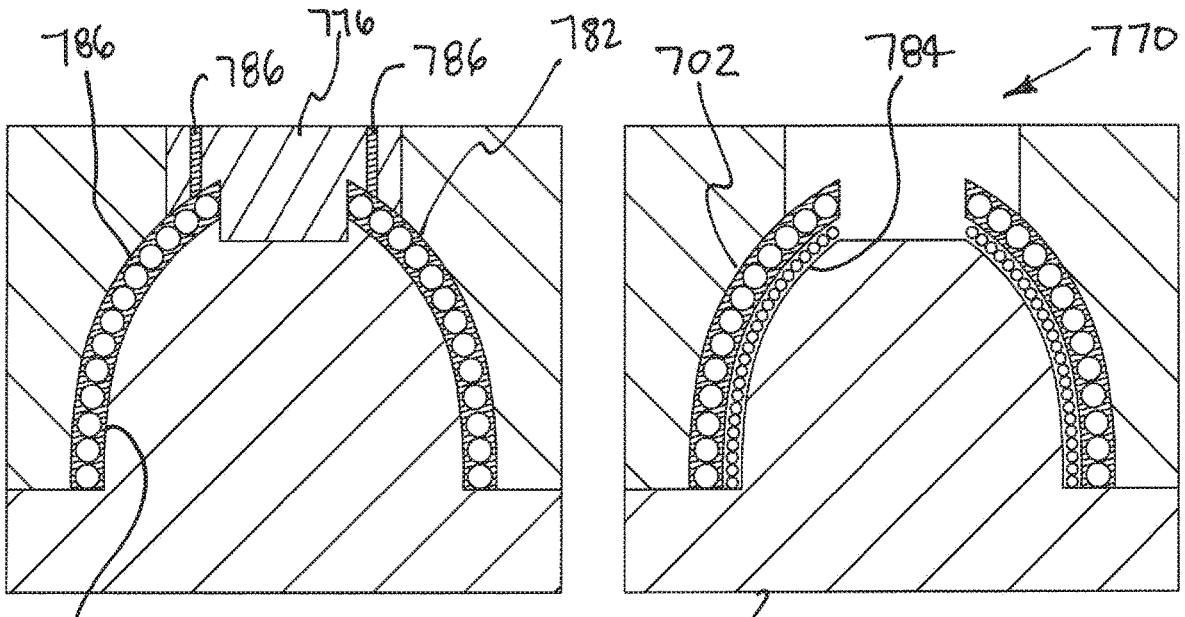

At FIG. 7C, the first annular containment 782 is filled with a first annular containment binder 786. In the illustrative embodiment of FIG. 7C, the first annular containment binder 786 has a flowable condition so that the first annular containment binder flows into space between fragments. In this way, the first annular containment binder 786 fills the volume of the first annular containment that is not occupied by fragments so that the first annular containment binder 786 may hold the fragments in place after the first annular containment binder 786 has been allowed to harden. The hardened first annular containment binder 786 and spherical fragments embedded within the first annular containment binder 786 form a first sleeve 702. With reference to FIG. 7C, it will be appreciated that first sleeve 702 generally has the shape of the first annular containment 782.

At FIG. 7D, the first mold insert 776 and the first core 772 are removed from the mold 770. A second core 774 is placed in the position formerly occupied by the first core 772. With reference to FIG. 7D, it will be appreciated that the second core 774 and first sleeve 702 defined a second annular containment 784. At FIG. 7D, a second multiplicity of spherical fragments of a uniform second size are loaded within the second annular containment 784.

Figure 7E:
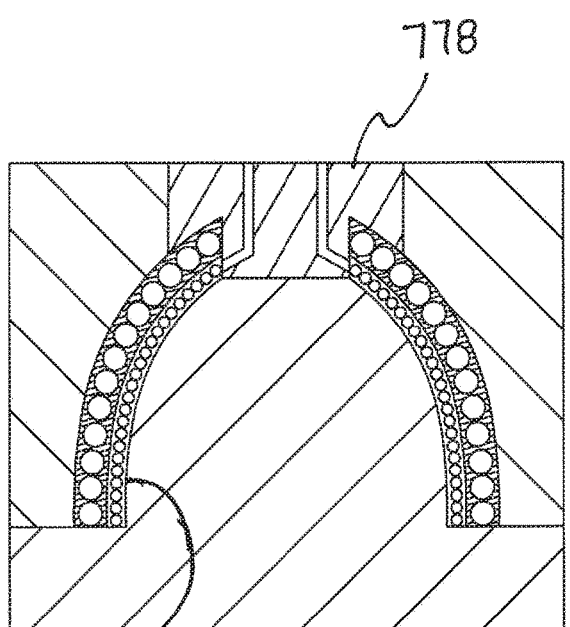

At FIG. 7E, a second mold insert 778 has been placed in the position formerly occupied by first mold insert 776.

Second plug 778 defines passageways that fluidly communicate with the second annular containment 784.

Figure 7F:
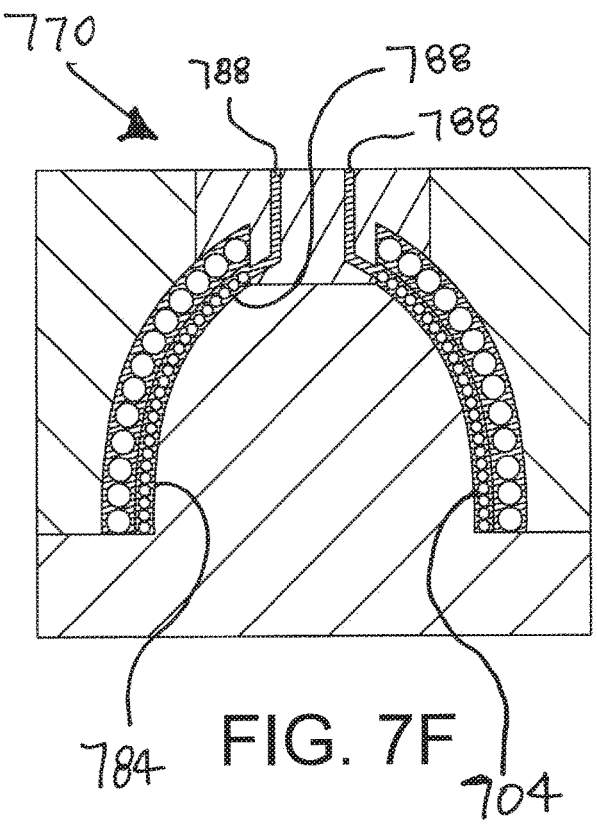

At FIG. 7F, the second annular containment 784 is filled with a second annular containment binder 788. In the illustrative embodiment of FIG. 7F, the second annular containment binder 788 has a flowable condition so that the second annular containment binder 788 flows into space between fragments. In this way, the second annular containment binder 788 fills the volume of the second annular containment that is not occupied by fragments so that the second annular containment binder 788 will hold the fragments in place after the second annular containment binder 788 has been allowed to harden. The hardened second annular containment binder 788 and spherical fragments embedded within the second annular containment binder 788 form a second sleeve 704. With reference to FIG. 7F, it will be appreciated that second sleeve 704 generally has the shape of the second annular containment 784.

Figure 7G:
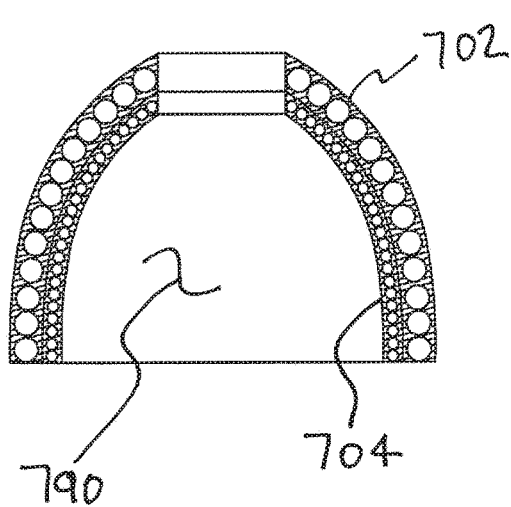

At FIG. 7G, the first sleeve 702 and the second sleeve 704 have been removed from the mold 770. With reference to FIG. 7G, it will be appreciated that second sleeve 704 defines a cavity 790. A warhead in accordance with this detailed description may include first sleeve 702, second sleeve 704 and an explosive charge disposed in cavity 790. The explosive charge may comprise, for example, a container filled with high explosives.

With continuing reference to FIGS. 7A through 7G, it will be appreciated that a method of manufacturing a warhead in accordance with this detailed description may include loading a first multiplicity of spherical fragments of a uniform first size within a first annular containment in an ordered arrangement and filling the first annular containment with a first annular containment binder for at least substantially covering the first multiplicity of spherical fragments. The first annular containment binder may have a flowable condition to facilitate filling of the first annular containment. The method may include allowing the binder to harden wherein the spherical fragments are embedded within the first annular containment binder in a first annular form having the shape of the first annular containment. This example method may also include loading a second multiplicity of spherical fragments of a uniform second size within a second annular containment having a wall surface that corresponds to a wall surface of the first annular containment. This method may additionally include filling the second annular containment with a second annular containment binder for at least substantially covering the multiplicity of spherical fragments. The second annular containment binder may have a flowable condition to facilitate filling of the second annular containment. The method may include allowing the second annular containment binder to harden wherein the spherical fragments are embedded within the second annular containment binder in a second annular form with the shape of the second annular containment. An explosive material may be positioned within a cavity defined by the annular forms. The first annular form, the second annular form and the explosive material may be positioned within a housing with one annular form interior to the other annular form.

Some example methods may include utilizing the second annular containment to define part of the first annular form and/or utilizing the first annular containment to define part of the second annular form.

Some example methods may include loading the second multiplicity of fragments such that each fragment that is not at a periphery of the ordered arrangement is in contact with a plurality of other adjacent fragments of the same size.

Some example methods may include overmolding one of the first annular form and the second annular form over the other of the first annular form and the second annular form.

Some example methods may include utilizing a thermoplastic resin as the first annular containment binder. A thermoplastic resin may also be utilized for the second annular containment binder in some example methods.

Some example methods may include installing the warhead in a deliverable weapon such as a missile, an artillery round, an aerial bomb, a mortar round, or a grenade.

Figure 8:
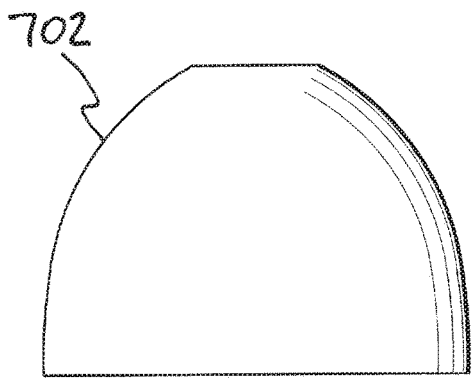
FIG. 8 is a side view showing an assembly fabricated using the manufacturing steps illustrated in FIGS. 7A through 7G.

FIG. 8 is a side view showing an assembly fabricated using the manufacturing steps illustrated in FIGS. 7A through 7G. An outer surface of first sleeve 702 is visible in FIG. 8

Figure 9:
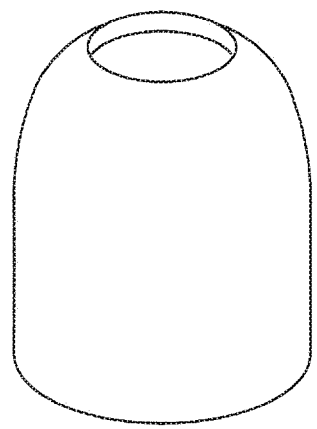
FIGS. 9-11 are perspective views of warheads according to embodiments of the invention.
Figure 10:
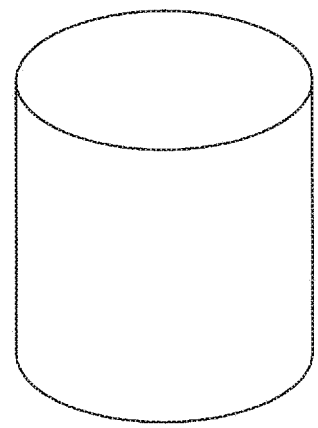
Figure 11:
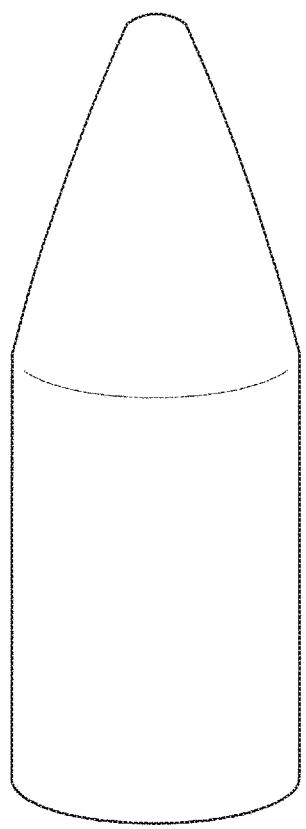

FIGS. 9-11 are perspective views of illustrative warheads according to embodiments of the invention. With reference to FIGS. 9-11, it will be appreciated that warheads may have various three dimensional shapes without deviating from the spirit and scope of this detailed description.

Figure 12A:
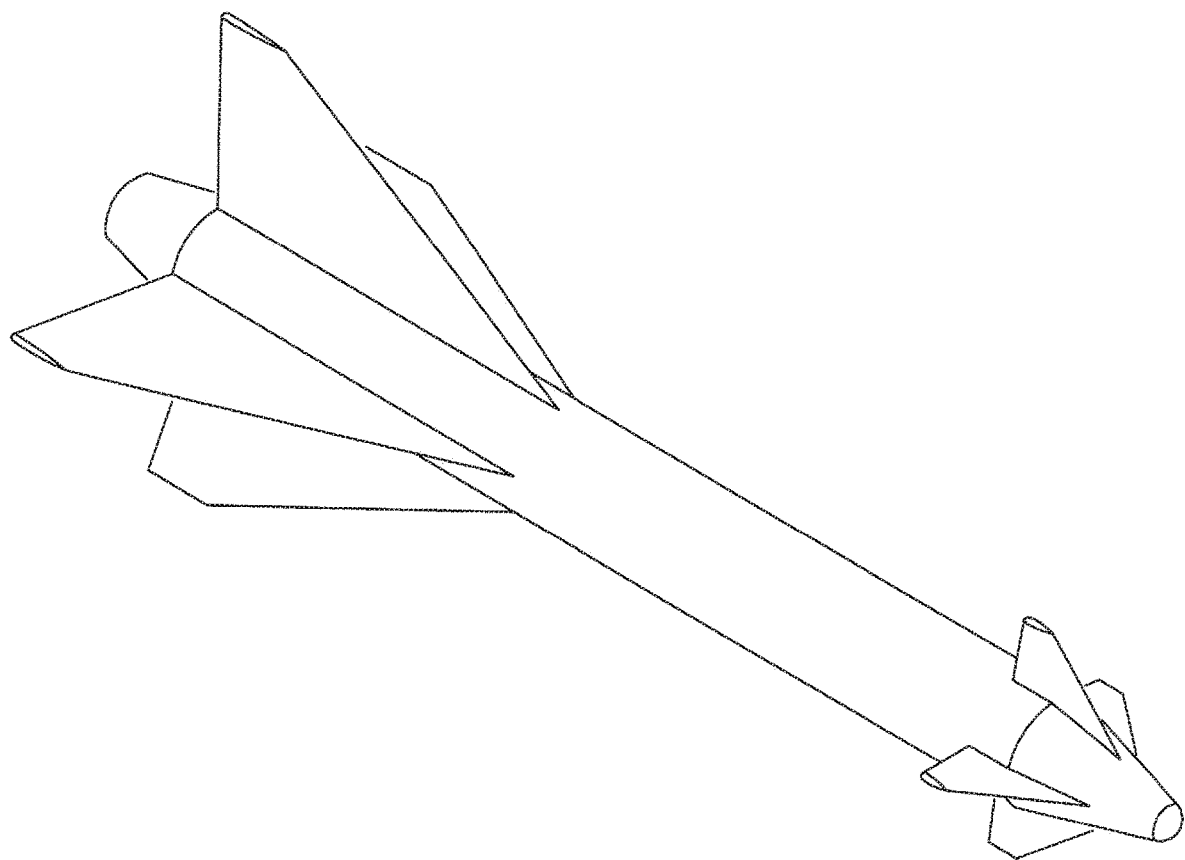
FIG. 12A is a perspective of a missile according to embodiments of the invention.

FIG. 12A is a perspective of a missile according to embodiments of the invention. The missile of FIG. 12A may include a warhead such as the illustrative warheads discussed in this detailed description. The missile may deliver the warhead to a precise location near a target. Once the warhead is near the target, the explosive charge may be detonated. The warhead may include concentric annular sleeves that upon detonation provide placement of smaller fragments of an inner annular sleeve interstitially with respect to larger fragments of an outer annular sleeve in an expanding fragmentation curtain that contains expanding gases to increase the pressure of the explosion and the kinetic energy transferred to the fragments. The fragments may neutralize the target.

Figure 12B:
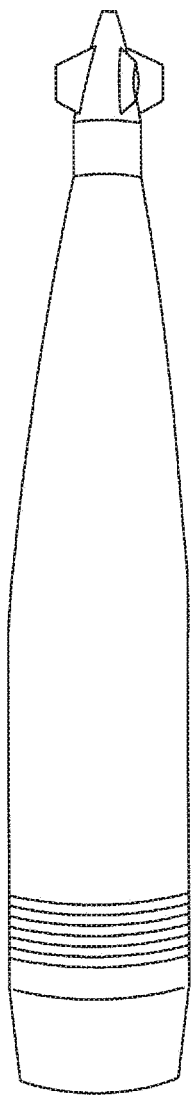
FIG. 12B is a perspective view of an artillery projectile according to embodiments of the invention.

FIG. 12B is a perspective view of an artillery projectile according to embodiments of the invention. The artillery projectile of FIG. 12B may include a warhead such as the illustrative warheads discussed in this detailed description. Warheads in accordance with this detailed description may be carried by various deliverable weapons. Examples of deliverable weapons include missiles, artillery rounds, aerial bombs, mortar rounds, and grenades. Warheads in accordance with this detailed description may also be incorporated into non-deliverable weapons. It is contemplated that warheads in accordance with this detailed description may be incorporated into landmines. In some applications, a warhead in accordance with this detailed description may a generally planar shape rather than an annular shape.

Patents incorporated by reference herein for all purposes include U.S. Pat. Nos. 8,931,415; 7,614,348; 6,981,672; 5,925,845; 5,404,813; 5,107,766; and 3,724,379.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of manufacturing a warhead comprising:
    loading a first multiplicity of spherical fragments of a uniform first size within a first annular containment;

filling the first annular containment with a first annular containment binder for at least substantially covering the first multiplicity of spherical fragments, the first annular containment binder having a flowable condition;

allowing the binder to harden wherein the spherical fragments are embedded within the first annular containment binder in a first annular form having the shape of the first annular containment;

loading a second multiplicity of spherical fragments of a uniform second size within a second annular containment having an inner wall surface that dimensionally corresponds to an outer wall surface of the first annular containment, the uniform second size diametrically at least 50 percent larger than the uniform size of the first multiplicity of spherical fragments;

filling said second annular containment with a second annular containment binder for at least substantially covering the multiplicity of spherical fragments, the second annular containment binder having a flowable condition;

allowing the second annular containment binder to harden wherein the spherical fragments are embedded within the second annular containment binder in a second annular form with the shape of the second annular containment; and positioning explosive material within a cavity defined by the first annular form; and affixing the first annular form and the second annular form within a housing with the first annular form interior to the second annular form and the explosive material interior to the first annular form, and wherein no explosive material is positioned intermediate the first annular form and the second annular form.

2. The method of claim 1 further comprising one of: utilizing the first annular form as part of the second annular containment, and utilizing the second annular form as part of first annular containment.

3. The method of claim 1 further comprising loading the second multiplicity of spherical fragments such that each fragment that is not at a periphery of an ordered arrangement is in contact with at least a plurality of other adjacent fragments of the same size.

4. The method of claim 1 further comprising filling one of the first annular containment and second annular containment with the respective annular containment binder using one of the first annular form and second annular form as part of said one of the first annular containment and second annular containment.

5. The method of claim 1 further comprising utilizing a thermoplastic resin as the first annular containment binder.

6. The method of claim 5 further comprising utilizing a thermoplastic resin for the second annular containment binder.

7. The method of claim 1 further comprising installing the warhead in a deliverable weapon.

8. The method of claim 1 further comprising selecting the uniform second size diametrically to be at least 100 percent larger than the uniform size of the first multiplicity of spherical fragments.

9. The method of claim 1 further comprising utilizing steel for the spherical fragments of the first multiplicity of spherical fragments and for the second multiplicity of spherical fragments.

10. The method of claim 1 wherein the maximum diameter of the spherical fragments of the second multiplicity of spherical fragments is 0.300 inches or less.

11. A warhead, comprising:
an explosive charge;
a first sleeve comprising a first set of uniform sized spherical fragments embedded in a binder disposed about the explosive charge;
a second sleeve comprising a second set of uniform sized spherical fragments embedded in a binder and disposed about the first sleeve, the second sleeve having an inner wall surface that dimensionally corresponds to an outer wall of the first sleeve;
the first set of fragments comprising small fragments and the second set of fragments comprising large fragments, wherein the large fragments are larger than the small fragments diametrically by at least 50%; and
a housing containing the first sleeve, the second sleeve, and the explosive charge, and wherein there is no explosive material positioned between the first sleeve and the second sleeve.

12. The warhead of claim 11, wherein the second sleeve comprises a single layer of the uniformed sized spherical fragments.

13. The warhead of claim 11 wherein the uniform second size is diametrically at least 100 percent larger than the uniform size of the first multiplicity of spherical fragments.

14. The warhead of claim 11, wherein:
the large fragments in the second set of fragments are arranged in a number of axial large fragment columns and a number of circumferential large fragment rows;
the small fragments in the first set of fragments are arranged in a number of axial small fragment columns and a number of circumferential small fragment rows;
the number of axial small fragment columns is greater than the number of axial large fragment columns; and
the number of circumferential small fragment rows is greater than the number of circumferential large fragment rows.

15. The warhead of claim 11, wherein the small fragments and the large fragments comprise the same material.

16. The warhead of claim 15, wherein the small fragments and the large fragments comprise a tungsten alloy.

17. A warhead, comprising:
an explosive charge;
a first sleeve comprising a first set of spherical fragments embedded in a binder disposed about the explosive charge;
a second sleeve comprising a second set of spherical fragments embedded in a binder and disposed about the first sleeve, the second sleeve having an inner wall surface that dimensionally corresponds to an outer wall of the first sleeve with no explosive material positioned between the first sleeve and the second sleeve;
the first set of fragments comprising small fragments and the second set of fragments comprising large fragments, wherein volumetrically, the large fragments are at least 300% larger than the small fragments.

18. The warhead of claim 17, wherein all of the small fragments in the first set of fragments have substantially equal diameters.

19. The warhead of claim 17, wherein all of the small fragments in the first set of fragments have substantially equal diameters.

20. The warhead of claim 19, wherein volumetrically, the large fragments are at least 600% larger than the small fragments.

21. The method of claim 17 further comprising installing the warhead in a deliverable weapon.

\* \* \* \* \*